United States Patent
Hirano et al.

(10) Patent No.: US 9,887,499 B2
(45) Date of Patent: Feb. 6, 2018

(54) COMMUNICATION CABLE CONNECTOR AND COMMUNICATION CABLE WITH CONNECTOR

(71) Applicant: Hitachi Metals, Ltd., Tokyo (JP)

(72) Inventors: Koki Hirano, Hitachinaka (JP); Yohei Shirakawa, Hitachi (JP)

(73) Assignee: HITACHI METALS, LTD., Tokyo (JP)

(*) Notice: Subject to any disclaimer, the term of this patent is extended or adjusted under 35 U.S.C. 154(b) by 171 days.

(21) Appl. No.: 14/742,242

(22) Filed: Jun. 17, 2015

(65) Prior Publication Data
US 2015/0372431 A1   Dec. 24, 2015

(30) Foreign Application Priority Data
Jun. 20, 2014   (JP) .................. 2014-127225

(51) Int. Cl.
| | |
|---|---|
| *H01R 13/17* | (2006.01) |
| *H01R 24/64* | (2011.01) |
| *H01R 13/66* | (2006.01) |
| *H01R 13/717* | (2006.01) |
| *H04Q 1/02* | (2006.01) |
| *H01R 107/00* | (2006.01) |

(52) U.S. Cl.
CPC ....... *H01R 13/717* (2013.01); *H01R 13/6675* (2013.01); *H01R 24/64* (2013.01); *H04Q 1/136* (2013.01); *H01R 2107/00* (2013.01)

(58) Field of Classification Search
CPC .. H01R 13/717; H01R 13/6675; H01R 24/64; H01R 2107/00
See application file for complete search history.

(56) References Cited

U.S. PATENT DOCUMENTS

| 5,414,343 A * | 5/1995 | Flaherty ............... G01R 31/024 324/539 |
| 2003/0222786 A1* | 12/2003 | Dannenmann ....... H01R 13/641 340/815.45 |
| 2013/0034990 A1* | 2/2013 | Warren .............. H01R 13/7175 439/490 |

FOREIGN PATENT DOCUMENTS

| JP | 2006-243834 A | 9/2006 |
| JP | 2010-238582 A | 10/2010 |
| JP | 2013-118091 A | 6/2013 |

OTHER PUBLICATIONS

Japanese Office Action, dated Aug. 22, 2017, in Japanese Application No. 2014-127225 and English Translation thereof.

* cited by examiner

Primary Examiner — Omer S Khan
(74) Attorney, Agent, or Firm — McGinn IP Law Group, PLLC.

(57) ABSTRACT

A communication cable connector includes a first connector section to be connected to one end of a communication cable including at least two or more signal lines, a second connector section to be connected to an other end of the communication cable, a first voltage applying circuit mounted to the first connector section to apply a DC voltage between any signal lines of the communication cable, and a first light emitting circuit mounted to the second connector section to emit light when the DC voltage is applied between the any signal lines of the communication cable by the first voltage applying circuit.

12 Claims, 5 Drawing Sheets

TO COMMUNICATION CABLE

| 22 | SIGNAL GENERATING CIRCUIT |
| 25 | RECTIFYING CIRCUIT |

COMMUNICATION CABLE CONNECTOR AND COMMUNICATION CABLE WITH CONNECTOR

The present application is based on Japanese patent application No. 2014-127225 filed on Jun. 20, 2014, the entire contents of which are incorporated herein by reference.

BACKGROUND OF THE INVENTION

1. Field of the Invention

This invention relates to a communication cable connector and a communication cable with that connector.

2. Description of the Related Art

For example, when using a large number of communication cables, or when laying a plurality of long communication cables under floor, it may not be possible to detect respective one ends in correspondence to respective other ends of the communication cables, and to detect connection destinations for the communication cables.

In that case, it is not likely to identify where any of the communication cables is being connected, and a failure such as erroneous detachment and erroneous connection is likely to occur.

As a conventional communication cable which solves the foregoing problem, there has been suggested a method by adding a detecting signal line separately from a signal transmission line, to use that detecting signal line, to thereby detect a connection destination for the communication cable.

Note that there is the following related art document.

SUMMARY OF THE INVENTION

However, when as in the conventional art the detecting signal line is added, the problem arises of being unable to use general-purpose communication cables being commonly used, and of increasing the cost of the whole system.

Accordingly, it is an object of the present invention to provide a communication cable connector, which solves the above problems, and which is capable of even using a general-purpose communication cable, detecting a connection destination for that communication cable, and a communication cable with that connector.

(1) In one embodiment of the invention, a communication cable connector comprises:

a first connector section configured to be connected to one end of a communication cable including at least two or more signal lines;

a second connector section configured to be connected to an other end of the communication cable;

a first voltage applying circuit mounted to the first connector section and configured to apply a DC voltage between any signal lines of the communication cable; and a first light emitting circuit mounted to the second connector section and configured to emit light when the DC voltage is applied between the any signal lines of the communication cable by the first voltage applying circuit.

In one embodiment, the following modifications and changes may be made.

(i) The communication cable connector further comprises a power supply device provided separately from the first connector section and the second connector section and configured to wiredly or wirelessly feed the first voltage applying circuit, wherein the first voltage applying circuit is configured to be fed by the power supply device and apply the DC voltage between the any signal lines of the communication cable.

(ii) The communication cable connector further comprises a second voltage applying circuit mounted to the second connector section and configured to apply a DC voltage between any signal lines of the communication cable excluding the signal lines to which the first voltage applying circuit applies the voltage; and a second light emitting circuit mounted to the first connector section and configured to emit light when the DC voltage is applied between the any signal lines of the communication cable by the second voltage applying circuit.

(iii) At least one of the first connector section and the second connector section comprises a plug provided integrally with an end of the communication cable.

(iv) At least one of the first connector section and the second connector section comprises a relay connector configured to connect two communication cables.

(v) The communication cable includes four pairs of signal lines, and the first voltage applying circuit applies the DC voltage between one pair of signal lines of the four pairs of signal lines.

(vi) The communication cable connector further comprises a housing for the second connector section, the housing including a light emission identifying window that allows for visual identification of light emission of the first light emitting circuit.

(vii) The housing for the second connector section comprises a material that transmits light of the first light emitting circuit.

(viii) The power supply device includes a first pin-shaped electrode, and the first connector section includes a connecting hole for receiving the pin-shaped electrode and a second feed electrode provided in the connecting hole.

(2) In Another Embodiment of the Invention, a Communication Cable with a Connector Comprises:

a communication cable including at least two or more signal lines;

a first connector section connected to one end of the communication cable;

a second connector section connected to an other end of the communication cable;

a first voltage applying circuit mounted to the first connector section, to apply a DC voltage between any signal lines of the communication cable; and a first light emitting circuit mounted to the second connector section and configured to emit light when the DC voltage is applied between any signal lines of the communication cable by the first voltage applying circuit, wherein the first connector section and the second connector section are provided integrally with both ends, respectively, of the communication cable.

In another embodiment, the following modifications and changes may be made.

(i) The communication cable with a connector further comprises a power supply device provided separately from the first connector section and the second connector section and configured to wiredly or wirelessly feed the first voltage applying circuit, wherein the first voltage applying circuit is configured to be fed by the power supply device and apply the DC voltage between the any signal lines of the communication cable.

(ii) The communication cable with a connector further comprises a second voltage applying circuit mounted to the second connector section and configured to apply a DC voltage between any signal lines of the communication cable excluding the signal lines to which the first voltage applying circuit applies the voltage; and a second light emitting circuit mounted to the first connector section and configured to emit light when the DC voltage is applied between the any signal lines of the communication cable by the second voltage applying circuit.

(iii) At least one of the first connector section and the second connector section comprises a plug provided integrally with an end of the communication cable.

(iv) At least one of the first connector section and the second connector section comprises a relay connector configured to connect two communication cables.

(v) The communication cable includes four pairs of signal lines, and the first voltage applying circuit applies the DC voltage between one pair of signal lines of the four pairs of signal lines.

(vi) The communication cable with a connector further comprises a housing for the second connector section, the housing including a light emission identifying window that allows for visual identification of light emission of the first light emitting circuit.

(vii) The housing for the second connector section comprises a material that transmits light of the first light emitting circuit.

(viii) The power supply device includes a first pin-shaped electrode, and the first connector section includes a connecting hole for receiving the pin-shaped electrode and a second feed electrode provided in the connecting hole.

(Points of the Invention)

The present invention allows for providing the communication cable connector, which is capable of even using the general-purpose communication cable, detecting a connection destination for the communication cable, and the communication cable with that connector. In the present invention, the connector for the communication cable is a communication system.

BRIEF DESCRIPTION OF THE DRAWINGS

The preferred embodiments according to the invention will be explained below referring to the drawings, wherein:

FIGS. 1A and 1B are diagrams showing a communication cable connector in one embodiment of the present invention, wherein

FIGS. 5A and 5B are diagrams showing a communication cable connector in another embodiment of the present invention, wherein

DETAILED DESCRIPTION OF THE PREFERRED EMBODIMENTS

Below are described embodiments according to the invention, in conjunction with the accompanying drawings.

Figure 1A:
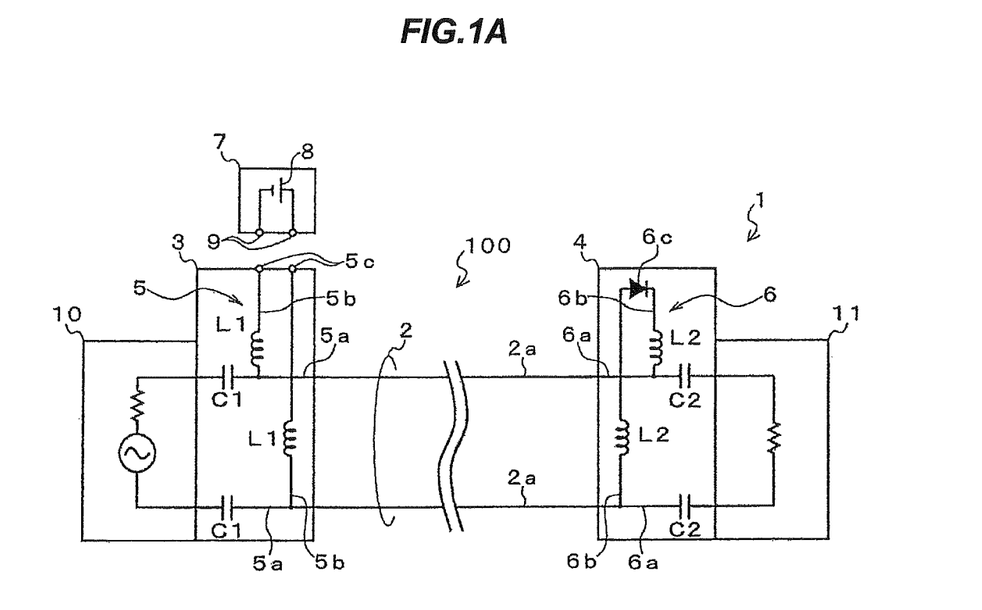
FIG. 1A is an entire circuit diagram including a transmitting device, a receiving device, and a communication cable.
Figure 1B:
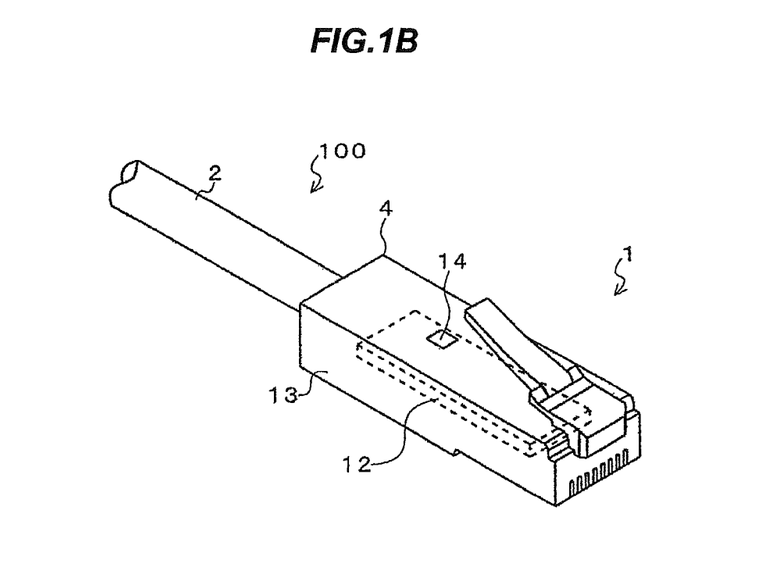
FIG. 1B is a perspective view showing a second connector section.

FIGS. 1A and 1B are diagrams showing a communication cable connector in the present embodiment. FIG. 1A is an entire circuit diagram including a transmitting device, a receiving device, and a communication cable, and FIG. 1B is a perspective view showing a second connector section.

As shown in FIGS. 1A and 1B, the communication cable connector includes a first connector section 3, which is connected to one end of a communication cable 2, and a second connector section 4, which is connected to the other end of the communication cable 2.

As the communication cable 2, it is possible to use a cable which is commonly used as a LAN cable. The present embodiment requires use of the communication cable 2 including at least two or more signal lines 2a. Herein, the communication cable 2 including four pairs (eight in total) of the signal lines 2a is used. In FIG. 1A, only one pair of these four pairs of the signal lines 2a is shown.

Further, in the present embodiment, it is described that the first connector section 3 is connected to a transmitting device 10 while the second connector section 4 is connected to a receiving device 11, but the first connector section 3 may be connected to the receiving device 11 while the second the connector section 4 may be connected to the transmitting device 10.

Now, the communication cable connector 1 in this embodiment includes a first voltage applying circuit 5, which is mounted to the first connector section 3 to apply a DC voltage between any signal lines 2a of the communication cable 2, and a first light emitting circuit 6, which is mounted to the second connector section 4 to emit light when the DC voltage is applied between any signal lines 2a of the communication cable 2 by the first voltage applying circuit 5.

The first voltage applying circuit 5 includes main transmission lines 5a, which electrically connect both the signal lines 2a and the transmitting device 10, respectively, and branch transmission lines 5b, which are branched from the main transmission lines 5a, respectively, and connected to feeding electrodes 5c, respectively.

The main transmission lines 5a on the transmitting device 10 side relative to the branching points of the branch transmission lines 5b, i.e. on the opposite side to the communication cable 2 are provided with capacitive elements C1, respectively, which pass a high frequency signal to be transmitted through the signal lines 2a, and which interrupt a DC signal to be input via the feeding electrodes 5c. The capacitive elements C1 are configured to prevent the DC signal input via the feeding electrodes 5c from being output to the transmitting device 10 side.

In addition, the branch transmission lines 5b are provided with inductive elements L1, respectively, which pass a DC signal to be input via the feeding electrodes 5c, and which interrupt a high frequency signal to be transmitted through the signal lines 2a. The inductive elements L1 are configured to prevent the high frequency signal transmitted through the signal lines 2a from being output to the feeding electrodes 5c side.

This embodiment further includes a power supply device 7 provided separately from the first connector section 3 and the second connector section 4, to wiredly or wirelessly feed the first voltage applying circuit 5. The first voltage applying circuit 5 is configured in such a manner as to be fed by the power supply device 7 and apply the DC voltage between any signal lines 2a of the communication cable 2.

The power supply device 7 includes a battery 8, and electrodes 9 connected to the battery 8, and is configured in such a manner as to connect the electrodes 9 to the feeding electrodes 5c respectively of the first voltage applying circuit 5, thereby feed the first voltage applying circuit 5 and apply the DC voltage between any signal lines 2a of the communication cable 2.

Figure 2A:
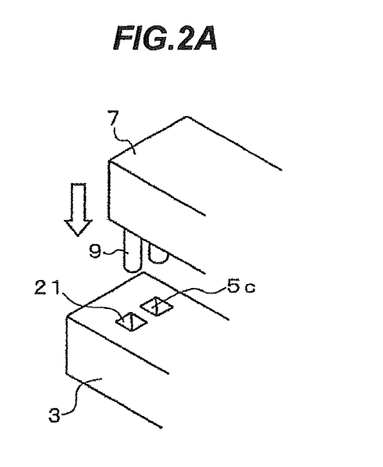
FIGS. 2A and 2B are explanatory diagrams showing feeding of a first voltage applying circuit by a power supply device.

For example, as shown in FIG. 2A, the first electrodes 9 of the power supply device 7 may be pin shaped and configured in such a manner as to insert the electrodes 9 into connecting holes 21 respectively formed in the first connector section 3, thereby bring the feeding electrodes 5c of the first voltage applying circuit 5 and the electrodes 9 into contact with each other respectively and electrically connect them together. Also, a connector for connecting both the electrodes 5c and 9 may be provided and configured to make the connection therebetween.

Figure 2B:
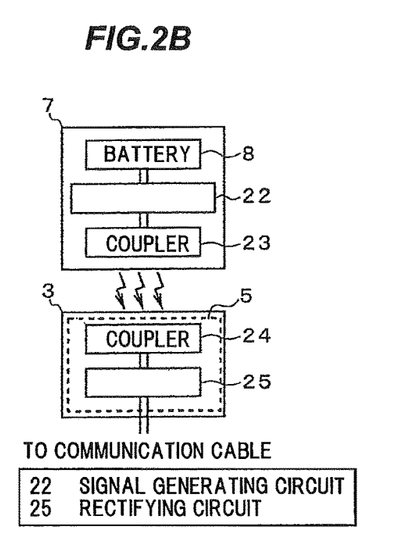

In the present embodiment, it is described that the first voltage applying circuit 5 is wiredly fed by the power supply device 7, but, as shown in FIG. 2B, it is also possible to perform wireless feeding (non-contact feeding) of the first voltage applying circuit 5 by the power supply device 7.

In this case, the power supply device 7 may be provided with a signal generating circuit 22 to generate a wireless feeding signal (a high frequency continuous sine wave having an almost constant amplitude), and a coupler (or an antenna) 23 to transmit the wireless feeding signal generated by the signal generating circuit 22. Further, the first voltage applying circuit 5 may be provided with a coupler (or an antenna) 24 to receive the wireless feeding signal transmitted from the power supply device 7, and a rectifying circuit 25 to rectify an AC electrical signal output from the coupler 24 into a DC (direct current). As the rectifying circuit 25, it is preferable to use a known full-wave rectifying circuit or a half-wave rectifying circuit.

Turning back to FIGS. 1A and 1B, the first light emitting circuit 6 includes main transmission lines 6a, which electrically connect both the signal lines 2a and the receiving device 11, respectively, and branch transmission lines 6b, which are branched from the main transmission lines 6a, respectively, and connected to a light emitting diode 6c.

The main transmission lines 6a on the receiving device 11 side relative to the branching points of the branch transmission lines 6b, i.e., on the opposite side to the communication cable 2 are provided with capacitive elements C2, respectively, which pass a high frequency signal, and which interrupt a DC signal. The capacitive elements C2 are configured to prevent the DC signal input from the first voltage applying circuit 5 via the signal lines 2a from being output to the receiving device 11 side.

Also, the branch transmission lines 6b are provided with inductive elements L2, respectively, which pass a DC signal, and which interrupt a high frequency signal. The inductive elements L2 are configured to prevent the high frequency signal transmitted through the signal lines 2a from being output to the light emitting diode 6c side.

It should be noted that the light emitting diode 6c is provided directly between both the branch transmission lines 6b herein, but it is desirable to provide a current adjusting circuit so that appropriate current is provided to the light emitting diode 6c. A specific configuration of the current regulating circuit is not particularly limited, but can be ensured by connecting a DC-DC converter or a constant current diode in series with the light emitting diode 6c, or connecting a Zener diode in parallel with the light emitting diode 6c, for example.

In this embodiment, the first connector section 3 and the second connector section 4 are made of RJ45 plugs (8P8C modular plugs) provided at both ends respectively of the communication cable 2. A communication cable 100 with the connector in this embodiment refers to the communication cable 2 with the first connector section 3 and the second connector section 4 provided integrally with both ends, respectively, of the communication cable 2.

The first voltage applying circuit 5 is mounted to a substrate provided inside the first connector section 3, and the first light emitting circuit 6 is mounted to a substrate 12 as shown in FIG. 1B provided inside the second connector section 4. The housing 13 for the second connector section 4 is provided with a light emission identifying window 14 that allows for visual identification of light emission of the first light emitting diode 6c. The light emission identifying window 14 is, e.g., an opening provided on the housing 13 for the second connector section 4. This opening may be filled with a material which transmits light of the light emitting diode 6c. Also, the entire housing 13 may be formed of a material that transmits light of the light emitting diode 6c. Note that, although not shown herein, the first connector section 3 has substantially the same appearance as that of the second connector section 4.

When a connection destination for the communication cable 2 is detected using the communication cable connector 1 in this embodiment, feeding is performed by connecting the electrodes 9 of the power supply device 7 to the feeding electrodes 5c of the first connector section 3. A DC voltage is then applied between the signal lines 2a of the communication cable 2 from the battery 8 via the inductive elements L1, electric current flows in the light emitting diode 6c via the signal lines 2a and the inductive elements L2, and the light emitting diode 6c emits light. A user can detect a connection destination for the communication cable 2 by identifying light emission of the light emitting diode 6c from the light emission identifying window 14.

Although not illustrated in FIG. 1, the communication cable connector may further be configured in such a manner that a second voltage applying circuit is mounted to the second connector section 4, to apply a DC voltage between any signal lines 2a of the communication cable 2 excluding the signal lines 2a to which the first voltage applying circuit 5 applies its voltage, i.e. between a different pair of signal lines 2a from the pair of signal lines 2a to which the first voltage applying circuit 5 applies its voltage, and that a second light emitting circuit is mounted to the first connector section 3, to emit light when the DC voltage is applied between the any signal lines 2a of the communication cable 2 by that second voltage applying circuit.

This configuration allows for, when the second voltage applying circuit of the second connector section 4 is fed by the power supply device 7, the second light emitting circuit mounted to the first connector section 3 to emit light, thereby making it possible to detect a connection destination for the communication cable 2 in both directions.

Figure 3:
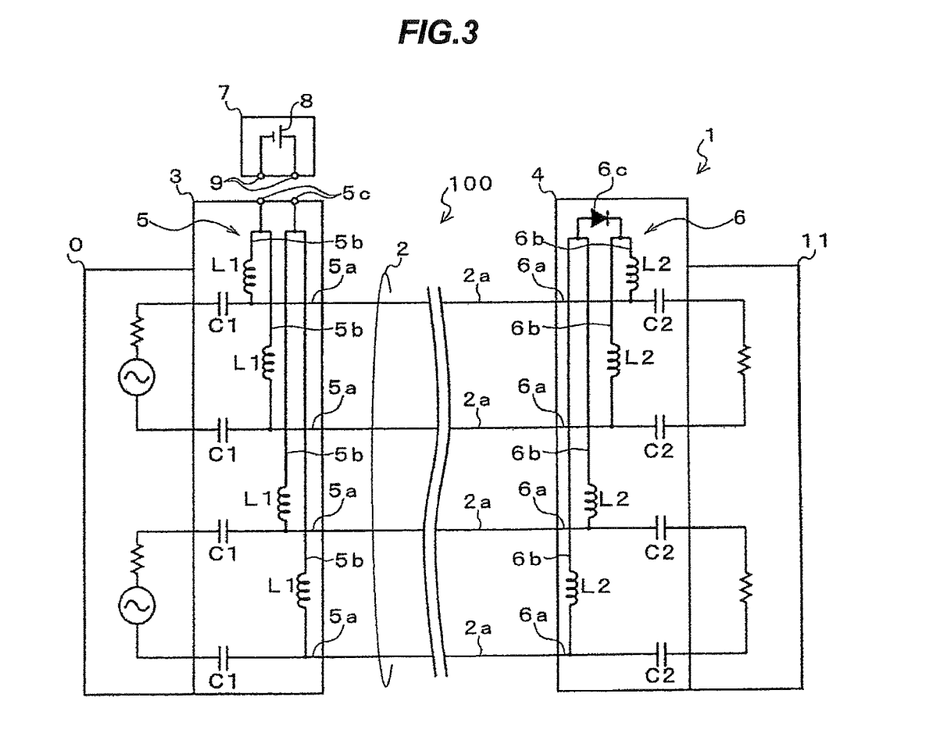
FIG. 3 is a circuit diagram showing one modification to the communication cable connector of FIGS. 1A and 1B.

Further, although in the present embodiment it has been described that a DC voltage is applied between the one pair of the signal lines 2a, it is also possible to perform DC voltage application between pairs, as shown in FIG. 3. In this case, the DC voltage application is performed between two signal lines 2a and two signal lines 2a. For example, when using four pairs of communication cables 2, it is possible to configure the first voltage applying circuit 5 to apply a DC voltage two pairs of the four pairs, and the second voltage applying circuit to apply a DC voltage to the remaining two pairs.

Further, although in the present embodiment, it has been described that the first connector section 3 and the second connector section 4 are provided integrally with the communication cable 2, the first connector section 3 and the second connector section 4 may instead be provided separately from the communication cable 2.

Figure 4:
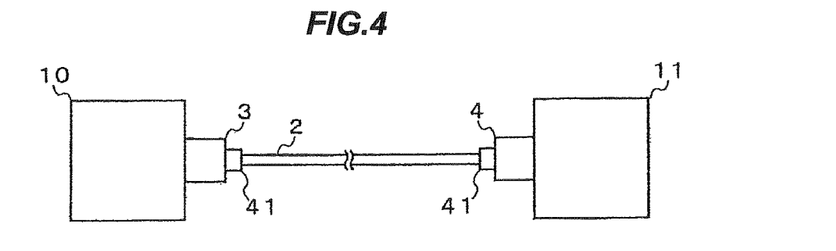
FIG. 4 is a diagram showing one modification to the communication cable connector for FIGS. 1A and 1B.

For example, as shown in FIG. 4, general-purpose plugs (RJ45 plugs) 41, which are provided at both the ends respectively of the communication cable 2 are used, so that the first connector section 3 and the second connector section 4 may be configured to be interposed between the plugs 41, and the transmitting device 10 and the receiving device 11 respectively, and connected together. In this case, the first connector section 3 and the second connector section 4 are provided with receptacles for the plugs 41 to be inserted therein respectively, and plugs to be inserted into receptacles provided in the transmitting device 10 and the receiving device 11 respectively.

When the first connector section 3 and the second connector section 4 are separate from the communication cable 2 and are applied to an existing communication system, it is possible to eliminate the need to replace the communication cable 2 and introduce them into that existing communication system at lower cost.

As described above, the communication cable connector 1 in this embodiment includes the first connector section 3 connected to one end of the communication cable 2 including at least two or more signal lines 2a, the second connector section 4 connected to the other end of the communication cable 2, the first voltage applying circuit 5 mounted to the first connector section 3, to apply a DC voltage between any signal lines 2a of the communication cable 2, and the first light emitting circuit 6 mounted to the second connector section 4, to emit light when the DC voltage is applied between any signal lines 2a of the communication cable 2 by the first voltage applying circuit 5.

This configuration allows for not adding a detecting signal line but even using the general-purpose communication cable 2, detecting a connection destination for the communication cable 2, and at low cost preventing erroneous detachment or erroneous connection.

Next, another embodiment of the present invention will be described.

Figure 5A:
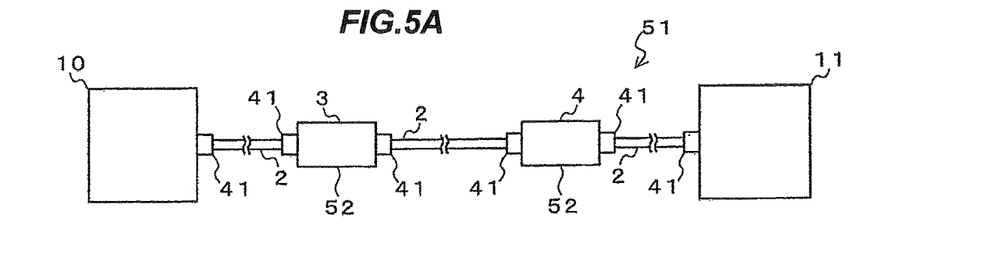
FIG. 5A is an entire configuration diagram including a transmitting device, a receiving device, and a communication cable.
Figure 5B:
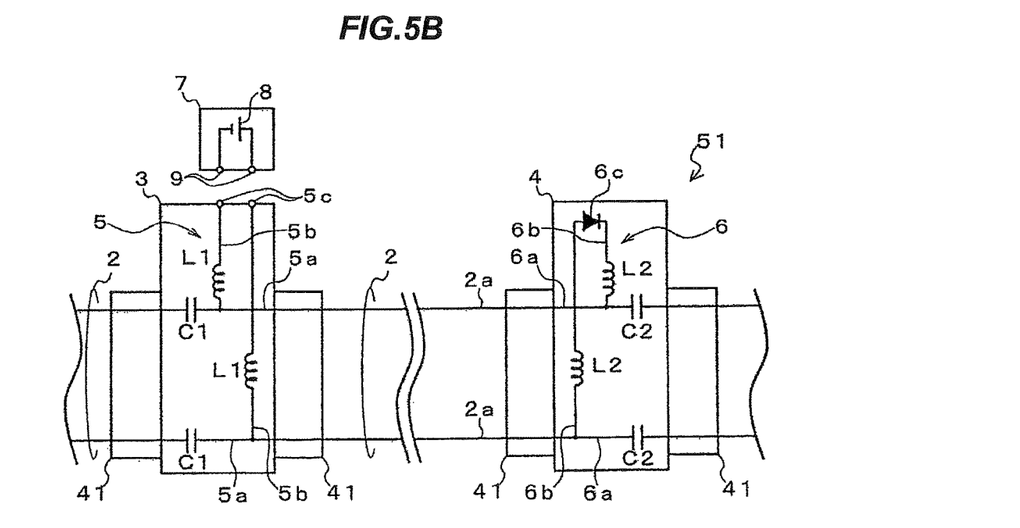
FIG. 5B is a circuit diagram thereof.

For a communication cable connector 51 as shown in FIGS. 5A and 5B, the first connector section 3 and the second connector section 4 are configured as relay connectors 52 respectively which are used to connect the two communication cables 2. In this case, as with the case of FIG. 4, the communication cable 2 with the general-purpose plugs 41 provided integrally therewith is used.

FIG. 5B shows only the first voltage applying circuit 5 in the first connector section 3 and the first light emitting circuit 6 in the second connector section 4, but it is desirable to mount the second voltage applying circuit to the second connector section 4, and the second light emitting circuit to one connector section 3, and thereby allow for connection detection in both directions. Since the configuration of each circuit is the same as that described in FIG. 1, the description thereof is omitted herein.

Figure 6A:
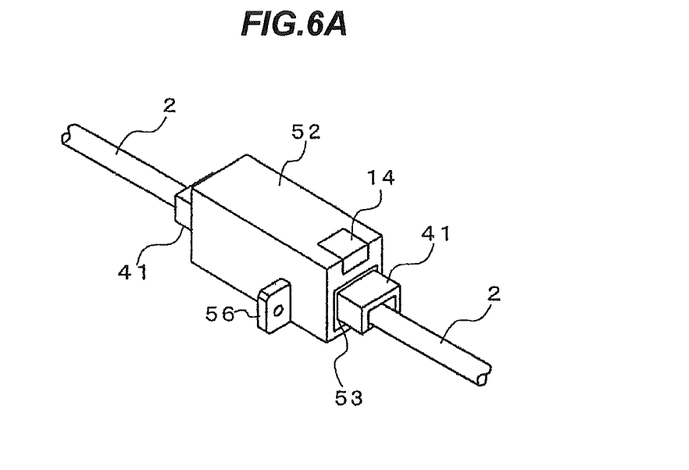
FIG. 6A is a perspective view showing a relay connector used in the communication cable connector of FIGS. 5A and 5B.
Figure 6B:
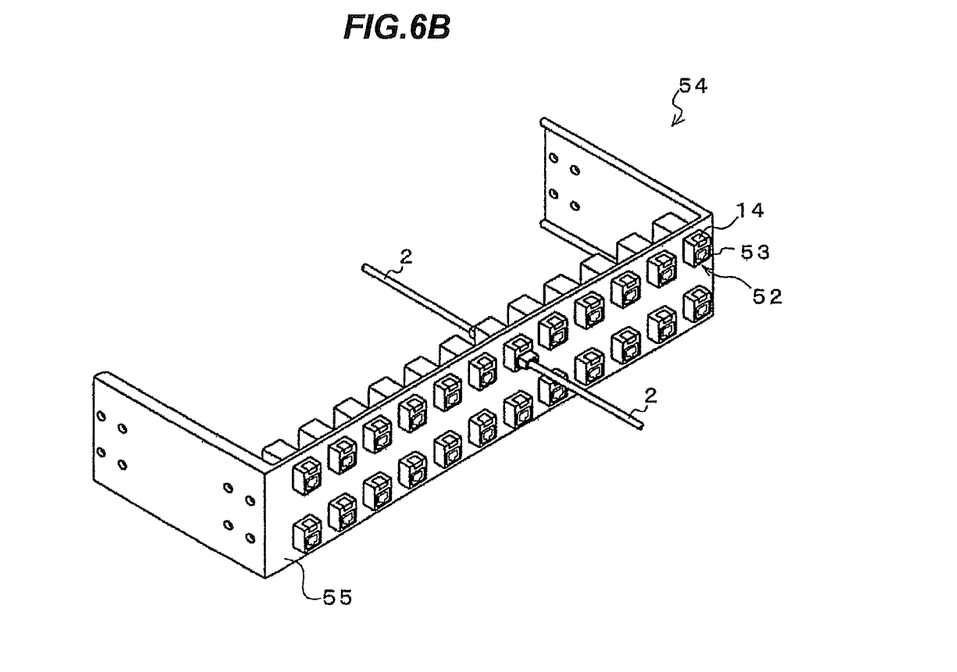
FIG. 6B is a perspective view showing a patch panel using that relay connector.

As shown in FIG. 6A, the relay connector 52 is provided with two receptacles 53 for connecting the plugs 41 of the communication cables 2, and is also termed simply "receptacle." As shown in FIG. 6B, it is also possible to use a plurality of the integrated relay connectors 52 as a patch panel 54, and the relay connector 52 is provided with a flange 56 for attachment to a panel 55. The relay connector 52 is provided with a light emission identifying window 14 at an upper portion of a portion to be exposed from a surface of the panel 55 (a portion on a tip side relative to the flange 56), so as to be able to identify light emission of the light emitting diode 6c even when used as the patch panel 54.

Figure 7A:
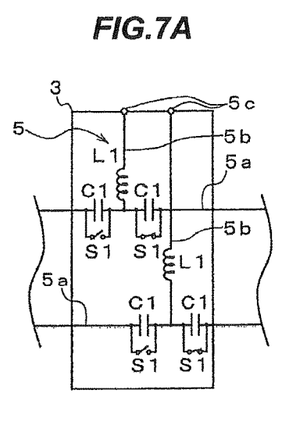
FIG. 7A is a circuit diagram showing one modification to a first voltage applying circuit used in the communication cable connector of FIGS. 5A and 5B.

When the first connector section 3 is configured as the relay connector 52, because the two communication cables 2 are connected together, the first voltage applying circuit 5 may be configured so as to be able to select which of the communication cables 2 a DC voltage is applied to. In this case, for example, as shown in FIG. 7A, both of the branching points of the branch transmission lines 5b at the main transmission lines 5a are provided with the capacitive elements C1, thereby allowing short circuiting switches 51 to be configured in such a manner as to be connected in parallel with the capacitive elements C1 respectively. In the configuration of FIG. 7A, when both the switches 51 are short-circuited, it is also possible to apply a DC voltage to both the communication cables 2.

Figure 7B:
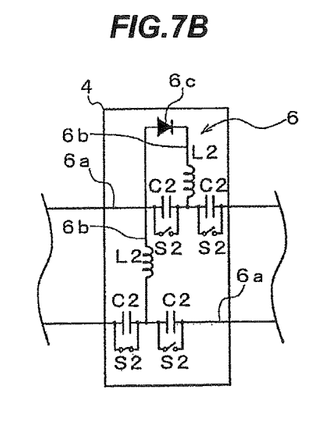
FIG. 7B is a circuit diagram showing one modification to a first light emitting circuit.

Similarly, when the second connector section 4 is configured as the relay connector 52, the first light emitting circuit 6 may be configured so as to be able to select which of the communication cables 2 a DC voltage is applied to. In this case, for example, as shown in FIG. 7B, both of the branching points of the branch transmission lines 6b at the main transmission lines 6a are provided with the capacitive elements C2, thereby allowing short circuiting switches S2 to be configured in such a manner as to be connected in parallel with the capacitive elements C2 respectively. In the configuration of FIG. 7B, when both the switches S2 are short-circuited, it is also possible to output a DC voltage input from one of the communication cables 2 directly to the other communication cable 2.

The use of the first voltage applying circuit 5 and the first light emitting circuit 6 configured as shown in FIGS. 7A and 7B allows for, when three or more of the relay connectors 52 are used, appropriately switching the switches S1 and S2, and thereby ensuring different variations on feeding and light emission patterns.

Figure 8A:
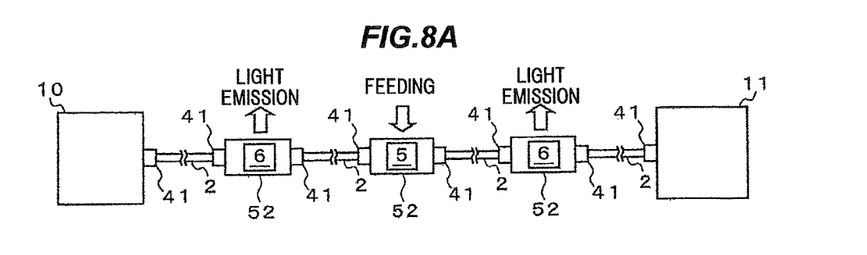
FIGS. 8A and 8B are explanatory diagrams showing examples of use of the first voltage applying circuit and the first light emitting circuit of FIGS. 7A and 7B.

For example, the following configuration can be ensured: As shown in FIG. 8A, when the first voltage applying circuit 5 is mounted to the middle relay connector 52 of the three relay connectors 52 connected in series, and the first light emitting circuits 6 are mounted to the relay connectors 52 at both ends respectively of the three relay connectors 52, feeding the middle relay connector 52 results in light emissions of the relay connectors 52 at both the ends.

Figure 8B:
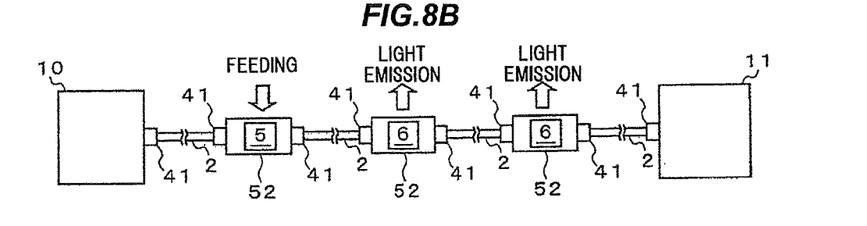

Also, for example, the following configuration can be ensured: As shown in FIG. 8B, when the first voltage applying circuit 5 is mounted to the relay connector 52 at one end of the three relay connectors 52 connected in series, and the first light emitting circuits 6 are mounted to the middle relay connector 52 and the relay connector 52 at the other end respectively, feeding the relay connector 52 at one end results in light emissions of the remaining relay connectors 52 connected to that relay connector 52 at one end.

In this manner, the invention is not limited to the above embodiments, but various alterations may naturally be made without departing from the spirit and scope of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A connector for a communication cable, the connector comprising:
   a first connector section configured to be connected to one end of a communication cable including at least two or more signal lines;
   a second connector section configured to be connected to an other end of the communication cable;
   a first voltage applying circuit mounted to the first connector section and configured to apply a DC voltage between signal lines of the communication cable;
   a first light emitting circuit mounted to the second connector section and configured to emit light when the DC voltage is applied between the signal lines of the communication cable by the first voltage applying circuit;
   a second voltage applying circuit mounted to the second connector section and configured to apply a DC voltage between signal lines of the communication cable excluding the signal lines to which the first voltage applying circuit applies the voltage;
   a second light emitting circuit mounted to the first connector section and configured to emit light when the DC voltage is applied between the signal lines of the communication cable by the second voltage applying circuit; and
   a power supply device provided separately from the first connector section and the second connector section, and configured to wiredly or wirelessly feed the first voltage applying circuit,
   wherein the first voltage applying circuit is configured to be fed by the power supply device and to apply the DC voltage between the signal lines of the communication cable;
   wherein the power supply device includes a pin-shaped electrode, and
   wherein the first connector section includes a connecting hole for receiving the pin-shaped electrode and a second feed electrode provided in the connecting hole.

2. The connector according to claim 1, wherein at least one of the first connector section and the second connector section comprises a plug provided integrally with an end of the communication cable.

3. The connector according to claim 1, wherein at least one of the first connector section and the second connector section comprises a relay connector configured to connect two communication cables.

4. The connector according to claim 1, wherein the communication cable includes four pairs of signal lines, and
   wherein the first voltage applying circuit applies the DC voltage between one pair of signal lines of the four pairs of signal lines.

5. The connector according to claim 1, further comprising:
   a housing for the second connector section, the housing including a light emission identifying window that allows for visual identification of light emission of the first light emitting circuit.

6. The connector according to claim 1, wherein a housing for the second connector section comprises a material that transmits light of the first light emitting circuit.

7. A connector for a communication cable, comprising:
   a first connector section connected to one end of the communication cable, the communication cable including at least two or more signal lines;
   a second connector section connected to an other end of the communication cable;
   a first voltage applying circuit mounted to the first connector section and configured to apply a DC voltage between signal lines of the communication cable;
   a first light emitting circuit mounted to the second connector section and configured to emit light when the DC voltage is applied between signal lines of the communication cable by the first voltage applying circuit, wherein the first connector section and the second connector section are provided integrally with both ends, respectively, of the communication cable;
   a second voltage applying circuit mounted to the second connector section and configured to apply a DC voltage between signal lines of the communication cable excluding the signal lines to which the first voltage applying circuit applies the voltage;
   a second light emitting circuit mounted to the first connector section and configured to emit light when the DC voltage is applied between the signal lines of the communication cable by the second voltage applying circuit; and
   a power supply device provided separately from the first connector section and the second connector section and configured to wiredly or wirelessly feed the first voltage applying circuit;
   wherein the first voltage applying circuit is configured to be fed by the power supply device and apply the DC voltage between the signal lines of the communication cable;
   wherein the power supply device includes a pin-shaped electrode, and
   wherein the first connector section includes a connecting hole for receiving the pin-shaped electrode and a second feed electrode provided in the connecting hole.

8. The connector according to claim 7, wherein at least one of the first connector section and the second connector section comprises a plug provided integrally with an end of the communication cable.

9. The connector according to claim 7, wherein at least one of the first connector section and the second connector section comprises a relay connector configured to connect two communication cables.

10. The connector according to claim 7, wherein the communication cable includes four pairs of signal lines,
    wherein the first voltage applying circuit applies the DC voltage between one pair of signal lines of the four pairs of signal lines.

11. The connector according to claim 7, further comprising:
    a housing for the second connector section, the housing including a light emission identifying window that allows for visual identification of light emission of the first light emitting circuit.

12. The connector according to claim 7, wherein a housing for the second connector section comprises a material that transmits light of the first light emitting circuit.

* * * * *